June 17, 1930. R. HOFSTETTER 1,764,628
INDICATING APPARATUS
Filed June 16, 1926
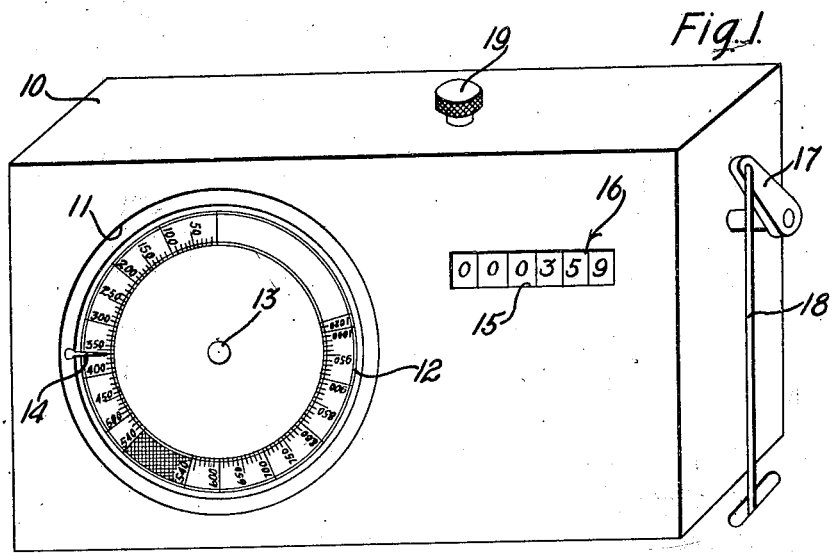
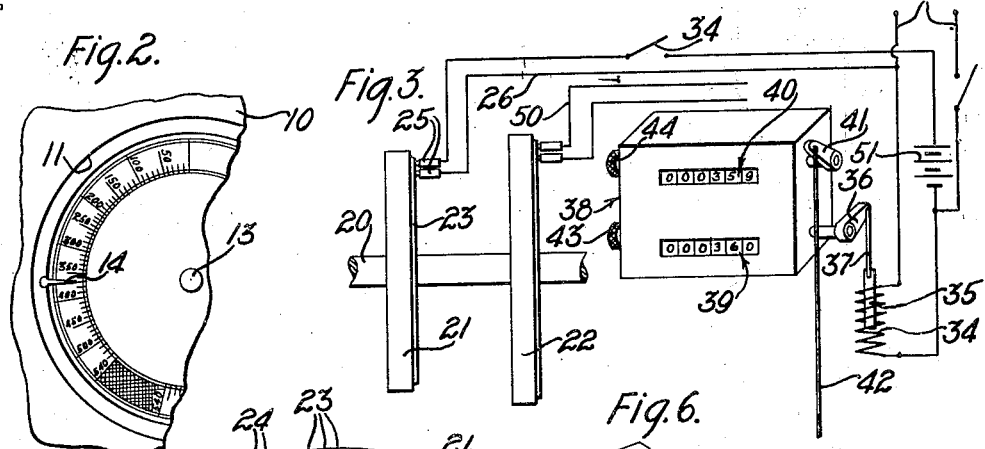
Inventor
Robert Hofstetter
by (signature) Att'y.

Patented June 17, 1930

1,764,628

UNITED STATES PATENT OFFICE

ROBERT HOFSTETTER, OF DOWNERS GROVE, ILLINOIS, ASSIGNOR TO WESTERN ELECTRIC COMPANY, INCORPORATED, OF NEW YORK, N. Y., A CORPORATION OF NEW YORK

INDICATING APPARATUS

Application filed June 16, 1926. Serial No. 116,294.

This invention relates generally to indicating apparatus, and more particularly to apparatus for indicating the output of operators or machines.

One object of the invention is to provide a simple and reliable apparatus for indicating the theoretical or standard number of operations a worker or a machine should have completed at any time.

Another object of the invention is to provide an apparatus for indicating for direct comparison the numbers of actual and theoretical or expected operations of a worker or a machine.

In accordance with the general features of the invention, there is provided a prime mover which operates at a constant rate of speed, and an indicating means controlled thereby, which may present indicia changing at either a uniform or non-uniform rate, according to the constancy of the rate at which the work is to be completed, the indicating means being adjustable so that any desired indicia may be presented. Preferably these indicia are presented in a position for ready comparison directly with indications of the actual output.

It is often advantageous in determining the efficiency of machinery to be able at any time to make a direct comparison between the actual and the theoretical outputs of a machine, and a device constructed in accordance with the present invention is particularly adapted to be used for that purpose.

Another important application to which the invention may be put is the indication at any time of the theoretical output of a worker or a group of workers. In one system of computing the earnings of workers, a flat rate of payment is established for the production of a specified number of pieces in a working day and additional payments are made for all of the pieces produced in excess of the specified number. This invention provides means whereby one or more workers may ascertain at any time the number of pieces or operations which should have been completed at that time and by comparing this number with that indicated on an auxiliary counter, which may be actuated at the completion of each piece or operation, the worker will immediately know whether the actual rate of production is slower or faster than the required rate.

It is believed that the invention will be clearly understood from the following detailed description, taken in connection with the accompanying drawing, in which Fig. 1 is a front elevation of an apparatus illustrating one embodiment of the invention;

Fig. 2 is a fragmentary front elevation of a modification thereof;

Fig. 3 is a diagrammatic view of an apparatus illustrating another embodiment of the invention;

Fig. 4 is an enlarged detail view of a contact wheel comprising a part thereof;

Fig. 5 is an enlarged fragmentary sectional view thereof, taken substantially on line 5—5 of Fig. 4;

Fig. 6 is an enlarged detail view of a spacing block forming a part thereof, and Fig. 7 is an enlarged detail view of a contact member forming a part thereof.

In the drawing, in which like numerals designate like parts throughout the several views, Fig. 1 illustrates one embodiment of the invention in which the prime mover consists of an ordinary clock-work such as that in an ordinary clock. The clock-work is mounted adjacent a circular aperture 11 in a casing 10 and in place of the usual dial and hands, there is substituted a rotating dial 12, which is rigidly secured to the shaft 13 upon which the hour hand is usually mounted, the dial 12 having suitable indicia thereon. A fixed pointer 14 is mounted in any suitable manner on the casing 10 adjacent the dial 12 to serve as a reference in reading the indicia.

Mounted adjacent an aperture 15 in the casing 10 is a registering mechanism 16 of any suitable type, which is controlled by means of the arm 17 through any suitable means such as the cord 18. The registering mechanism is also provided with suitable means of any usual type, controlled by the knob 19 for the purpose of returning the indicia to their zero position or for setting the indicia at any desired value.

Let us suppose that the specified rate of production is 1020 pieces or operations in a working day of 8½ hours. In the embodiment illustrated by Fig. 1, the dial 11 is graduated so as to provide indicia reading from zero to 540 within the space which would be traversed within the first 4½ hours, corresponding to the working period from 7.30 a. m. until noon, the space corresponding to the noor hour is left blank and the space corresponding to the period from 1 p. m. until 5 p. m. is graduated so as to provide indicia reading from 540 to 1020.

In operation, the clock will be wound and started, and the dial 12 rotated by the usual setting means until the zero mark on the dial is opposite the fixed pointer 14 at the beginning of a working day. The dial 12 will be rotated by the clock mechanism at a uniform velocity in a clockwise direction, as seen in Fig. 1, and the indicia will thereby be successively brought opposite the pointer 14. The worker may then actuate the registering mechanism 16 through the cord 18 at the end of each operation to indicate the actual number of operations completed. Since the indicia on the dial 12 are arranged to indicate the theoretical number of operations that should have been completed at any time, by comparing the readings on the register and on the dial, the worker may at any time ascertain whether the specified rate is being maintained.

Although the divisions of the indicia are represented as uniform in the embodiment of the invention illustrated by Fig. 1, they might properly be spaced unevenly, since it is a well known fact that operators work at fluctuating rates, depending upon the kind of work done. For example, in ordinary machine work peaks of output are reached at mid-forenoon and mid-afternoon. The divisions of the indicia might well vary accordingly, as is shown in the modification illustrated by Fig. 2, to cause the indication of the theoretical or expected output to more nearly coincide with the actual production. In this modification the indicia corresponding to the theoretical output for the morning work period are shown and it will be noted that the total expected output for the morning period is the same as that for the corresponding period in the first modification. However, the indicia are spaced more widely at the beginning and at the end of the period and are placed more closely together in the intermediate portion than is done in the first modification, thereby causing the indicia to correspond approximately with the average output of the workers.

In the embodiment of the invention illustrated by Figs. 3 to 7 inclusive, there is provided a shaft 20 connected in any suitable manner to a prime mover (not shown) which is adapted to operate at a constant rate of speed upon which shaft are rigidly mounted a plurality of contact wheels 21 and 22. The prime mover connected to the shaft 20 may be of any suitable type so long as it may operate at a constant rate of speed, a constant speed electric motor being a very satisfactory device to use.

Since the construction of the contact wheels 21 and 22 is similar, only the wheel 21 will be described in detail, it being understood, however, that the other wheel 22 is is provided with parts corresponding to those described in connection with the wheel 21.

The contact wheel 21, as shown in Fig. 4, carries a series of metallic contact members 23—23 insulated from each other by spacing blocks 24—24 made of a suitable insulating material, such as hard rubber, which contact members are adapted to cooperate with brushes 25—25 suitably mounted in fixed position to intermittently close an electric circuit 26. The contact members 23—23 and the spacing blocks 24—24 (Figs. 5, 6 and 7) are of trapezium shaped cross section and are mounted in a circular groove 28 extending completely around the face of the contact wheel 21. One edge 29 of the groove is inclined with respect to the bottom (Fig. 5) so as to conform with one inclined edge of the contact members and spacing blocks, while the opposite edge of the groove is straight, the bottom and inclined edge of the groove being covered with a layer 30 of a suitable insulating compound. The contact members 23—23 and the spacing blocks 24—24 are inserted in the groove 28 with one inclined surface in contact with the insulating material covering the inclined edge 29 of the groove 28 and a series of clamping blocks 31, composed of an insulating material, such as hard rubber, are clamped against the contact members 22 and the spacing blocks 27—27 by means of screws 33 threaded into the body of the contact wheel 21.

The circuit 26 controlled by the contact members 23—23 leads from a source of electrical energy such as a battery 51 to a solenoid 34 adapted to accuate a plunger 35 connected by means of a link 37 to an arm 36 of an indicating mechanism 38, a switch 34 being provided to open the circuit during the period when the indicating device is not in use. The indicating device 38 may be of any well known type and is provided with two sets of indicia 39 and 40, the indicia 39 being adapted to be automatically controlled by the solenoid 35 and the indicia 40 being adapted to be manually controlled by means of an arm 41 through a suitable operating member, such as a cord 42. The indicating mechanism 38 is also provided with suitable means of any usual type controlled by knobs 43 and 44 for the purpose of returning the indicia 39 and 40 to their zero positions or for setting the indicia at any desired values.

Let us again suppose that the rate of production is 1020 parts or operations in a working day of 8½ hours. Within the space upon the contact wheel 21 which would be traversed within the first 4½ hours there are inserted fifty-four of the contact members 23—23 separated by a corresponding number of spacing blocks 24—24. There are no contact members located in the space which would be traversed within the next or noon hour, while within the space traversed within the succeeding 4 hours there would be located forty-eight contact members. The part of the indicating mechanism controlled by the arm 36 is then adjusted so that 10 units of the indicia will be added upon each actuation thereof.

The operation of this embodiment of the invention is as follows: The indicia 39 and 40 are turned to zero or to any other desired reading and the contact wheel 21 is rotated manually or in any other suitable manner at the beginning of a working day until the first spacing block 24 is in alignment with the brushes 25—25. The switch 34 is then closed and the prime mover is started so that the shaft 20 is slowly rotated at a constant rate of speed. At the end of predetermined intervals the brushes 25—25 will coact with the contact members 23—23 to intermittently close the circuit 26 which may be traced from one terminal of the battery 51 through the solenoid 34, one brush 25, the engaged contact member 23, the other brush 25, the closed switch 34 and thence to the other terminal of the battery 51. The solenoid 34 energizes and thereby intermittently actuates the arm 36 which controls the indicia 39. The worker may operate the arm 41 by means of the cord 42 at the completion of each operation, the total number of operations being indicated by the indicia 40. By comparing the readings of the two indicia, which are positioned for ready and direct comparison, the worker or a supervisor may at any time ascertain whether or not the specified or theoretical standard rate is being maintained.

The contact wheel 22 is also supplied with contact and spacing members similar to those described in connection with the wheel 21, which members control a circuit 50 similar to circuit 26, connected to an indicating mechanism, which may be similar to the mechanism 38 or which may comprise a single automatic register, the manually operated indicia being omitted in that case. Any number of contact wheels may be mounted on the shaft 20 which may have different combinations in the arrangement of the contact members and which may have their respective indicating mechanisms located in various parts of the plant. Also a plurality of indicating devices may be placed in a single circuit in any suitable manner, such as by the lead wires 52, and be disposed at various points as desired. By such arrangements, one constant speed prime mover may serve to control a large number of indicating devices, which is advantageous because the moving parts ar centralized, thereby rendering them readily accessible for inspection and for changing the spacing of the contact members.

Although the contact members 23—23 are illustrated as spaced evenly in the embodiment of the invention illustrated by Figs. 3 to 7 inclusive, they might also be spaced unevenly, as the indicia are in the embodiment illustrated by Fig. 2, to cause the indicia 39 to change at a rate which fluctuates to correspond with the rate of the output of the workers.

When it is desired to change the indicia, this may be readily done in any of the above embodiments of the invention. In the embodiments illustrated by Figs. 1 and 2, the dial carrying the indicia may be removed at any time and another dial with the desired indicia thereon substituted. In the embodiment illustrated by Figs. 3 to 7 inclusive, the desired change may be made in several ways. The setting of the part of the indicating mechanism 38 controlled by the arm 36 may be varied to cause a greater or less change in the indicia with each actuation of the arm; the width of the spacing blocks 24—24 may be varied to space the contact members 23—23 at any desired intervals; the size of the contact wheels 21 and 22 may be varied to enable a greater or lesser number of contact members to contact with the brushes during the same angular displacement of the wheels; or any combination of the above changes may be made. It will thus be seen that a large number of arrangements of the indicia are available in the first two modifications, while an almost unlimited number of permutations for the output indicia are available in the last modification.

What is claimed is:

1. In an indicating apparatus, a circuit controlling disk provided with a circular dove-tailed groove around one face thereof, a plurality of trapezium shaped contact members adjustably secured in the groove, a plurality of trapezium shaped insulating spacing blocks mounted in the groove separating the contact members, a plurality of arcuate insulating blocks for adjustably securing the contact members and the spacing blocks in the groove, each of the insulating blocks extending laterally of a group of the contact members and the spacing blocks at one end thereof, means for rotating the disk at a constant velocity, and brushes adapted to coact with the contact members and the spacing blocks for intermittently opening and closing an electric circuit.

2. In an indicating apparatus, a rotatable circuit-controlling member provided with a circular groove upon one face thereof, the outer face of said groove being undercut, a plurality of contact members mounted in said groove and having their outer edges beveled to conform to the undercut face of the groove, a plurality of insulating spacing members separating the contact members, and a plurality of insulating blocks removably secured to the circuit-controlling member and engaging the contact members and the spacing members to removably secure them in the groove, each of the insulating blocks extending laterally of a group of the contact and spacing members at one end thereof.

3. In an indicating apparatus, a rotatable circuit-controlling member provided with a circular groove upon one face thereof, the outer face of said groove being undercut, a plurality of contact members mounted in said groove and having their outer edges beveled to conform to the undercut face of the groove, a plurality of insulating spacing members separating the contact members and having their outer edges beveled to conform to the undercut face of the groove, and a plurality of insulating blocks removably secured to the circuit-controlling member and engaging the contact members and the spacing members to removably secure them in the groove, each of the insulating blocks extending laterally of a group of the contact and spacing members at one end thereof.

In witness whereof, I hereunto subscribe my name this 3 day of June A. D., 1926.

ROBERT HOFSTETTER.